350-377 SR
XR 3,491,351
TX 4030W
WP

METHOD AND APPARATUS FOR CANCELLING NOISE IN A MAGNETO-OPTIC READOUT SYSTEM

Filed Sept. 29, 1966

INVENTORS
DAVID TREVES,
PHILIP SMALLER, &
IRVING W. WOLF

BY Robert G. Clay
ATTORNEY

3491351
OR IN 360/114

United States Patent Office 3,491,351

Patented Jan. 20, 1970

3,491,351

METHOD AND APPARATUS FOR CANCELLING NOISE IN A MAGNETO-OPTIC READOUT SYSTEM

Philip Smaller, David Treves and Irving Wolf, Palo Alto, Calif., assignors to Ampex Corporation, Redwood City, Calif., a corporation of California Filed Sept. 29, 1966, Ser. No. 583,509
Int. Cl. G11b *5/00;* G02f *1/22*
U.S. Cl. 340—174.1 8 Claims

ABSTRACT OF THE DISCLOSURE

A method and apparatus for cancelling noise in a magneto-optic readout system wherein a linearly polarized light beam is reflected from, or through, a magnetic storage medium. The beam from the medium is then amplitude split into two beams identical in every respect except their direction of propagation. Two analyzers intercept the beams such that the signals thereof due to the different states of magnetization appear out-of-phase, i.e., in opposie polarity, in the two channels. Representative electrical signals are introduced as two inputs to a difference amplifier. Since the two beams come from exactly the same incremental area of the medium, have the same direction of polarization and angle of incidence, and come from the same light source, all the fluctuations originating from medium surface imperfections, changes in reflectivity and source intensity will cancel out, while the information signals, which appear in opposite polarities in the two channels, are added via the difference amplifier.

The invention herein described was made in the course of a contract with the Department of United States Army.

The present invention relates generally to magneto-optic readout systems and more particularly to a noise cancellation scheme for improving the signal-to-noise ratio of a magneto-optic readout system.

Magneto-optic readout systems provide a means whereby magnetic recordings of high bit densities may be accurately and rapidly retrieved. In the magneto-optic readout technique as presently known and as shown for example in U.S. Patent No. 3,171,754 issued Mar. 2, 1965, and assigned to the same assignee as the present application, the Kerr or Faraday magneto-optical effect is utilized to detect the presence of magnetic recordings stored in the recording medium. By way of example, the Kerr magneto-optical effect is exhibited by a magnetic surface which is illuminated by a beam of polarized light. The plane of polarization of the beam reflected from the surface magnetized in one direction is rotated with respect to the plane of polarization of light reflected from a surface magnetized for example in the opposite direction such as is commonly done in digital recording. To illustrate, when the polarized beam is reflected from a portion of the magnetized surface having a positive magnetic bit stored therein, the plane of polarization of the reflected beam is rotated through a particular angle. However, when the polarized beam is reflected from a stored negative magnetic bit, the plane of polarization of the reflected beam is rotated through a different angle, generally anti-symmetrically to or opposite the positive bit rotation angle. Thus, the presence of a positive or a negative bit stored in the storage medium may be readily detected by sensing the degree and/or angle of rotation of the plane of polarization of the reflected beam.

In making such magneto-optic readout systems, consideration must be given to the various noise sources in the system. Such noise sources consist of generally; shot noise in the light detector; regular noise, which includes all spurious fluctuations in the light level that reach the photomultiplier which are independent of the state of magnetization of the storage media, and which are generally due to surface imperfections and light source fluctuations; and modulation noise which appears as random modulation of the signal due to light source and reflectivity fluctuations.

It has been found that regular noise due to recording medium surface noise and light fluctuations constitutes a predominant portion of the noise which is detrimental to, and results in a decrease of, the signal-to-noise ratio of the readout system. Since a large improvement in the signal-to-noise ratio would make the entire concept of magneto-optic readout considerably more practical and would result in a relatively feasible readout system, any means by which the signal-to-noise ratio of the readout system can be improved is highly desirable.

Typical of magneto-optic readout systems as known in the art are those described in the article "Magneto-Optical Readout" by T. Lentz and J. Miyata, Electronics, 34, Sept. 1, 1961, pages 36–39, and in the U.S. Patent No. 3,268,879 issued to S. Lins. The article describes a readout system which utilizes a beam splitting concept, wherein however, the beam reflected by the storage medium is split, and the polarizer and analyzer components are replaced, by a polarized beam splitter which separates the S and P polarization components of the beam, and directs each component into a respective channel. Thus the two split beams are not identical in every respect, and complete noise cancellation is not obtained. The U.S. Patent 3,268,879 describes a readout system utilizing a split beam concept, wherein each beam is modulated by a polarization azimuth vibrator, and the system is accordingly particularly directed toward a modulation readout effect apparatus generally used in readout of still media, wherein the vibrators are modulated by an alternating current. The use of the vibrators make the system relatively cumbersome and complex.

Accordingly, the present invention provides a method and apparatus for improving the operation of a magneto-optic readout system, by providing a relatively simple noise cancellation scheme which radically improves the signal-to-noise ratio of the magneto-optic readout system.

It is thus an object of the invention to provide a noise cancellation scheme for magneto-optic readout systems, which is capable of cancelling the surface and light fluctuation noise inherent in a readout system to thereby improve the signal-to-noise ratio thereof.

It is another object of the invention to provide a noise cancellation scheme utilizing a two channel, differential detection or "cancellation" system wherein the noise due to surface imperfections and light fluctuations appear in phase, or in common mode, and are cancelled.

It is yet another object of the invention to provide a noise cancellation scheme for a magneto-optic readout system, which utilizes a direct readout effect, thus precluding the need for a relatively complex, modulated readout effect and apparatus.

It is a further object of the invention to provide a noise cancellation scheme utilizing a two channel system wherein the signals representing the information and carried by the two channels appear in opposite polarity or 180° out-of-phase and are subtracted to provide, in effect, a summed output.

It is still another object of the invention to provide a noise cancellation scheme utilizing two channels wherein an analyzer in one channel has its extinction axis set anti-symmetrically with respect to the extinction axis of an analyzer in the second channel.

Other objects and advantages will be apparent from the specification taken in conjunction with the drawings in which.

Briefly, in the cancellation scheme of the present invention, a linearly polarized beam is reflected off a recording medium having a magnetizable surface or layer. The reflected beam is thereafter amplitude split into two beams identical in every respect except in direction of propagation. Two analyzers are disposed to intercept the two beams in such a manner that the signals due to the different states of magnetization appear out-of-phase i.e., in opposite polarity, in the two channels. The light emerging from the analyzers is converted to two electrical signals which are introduced as two inputs to a difference amplifier. Since the two beams are reflected from exactly the same incremental area of the medium, have the same direction of polarization and angle of incidence and come from the same light source, all the fluctuations that come from the surface imperfections, changes in reflectivity and source intensity will cancel out, while the information signals, which appear in opposite polarities in the two channels, will be added by the difference amplifier.

Figure 1:
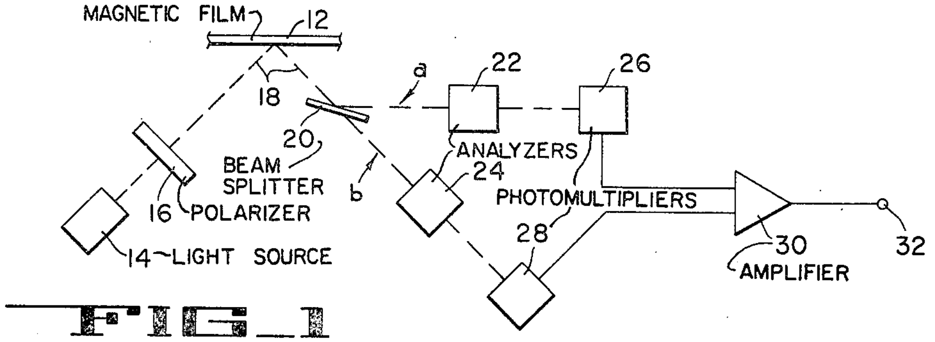
FIGURE 1 is a schematic diagram of apparatus which may be utilized to perform the method of the invention.

Referring to FIGURE 1 there is shown by way of example only, apparatus which is capable of performing the method of the invention. Accordingly, there is shown a magneto-optic noise cancellation readout system 10, employing a storage medium 12 of the type having a magnetic film surface in the form of thin solid films, thick magnetic films or conventional magnetic tapes. A source of high energy light, such as a laser 14, is disposed to direct a beam of light through light polarizing means 16 such a Nicol prism or a Polaroid sheet, wherein the resulting linearly polarized beam herein depicted by numeral 18, is impinged upon the surface of the storage medium 12 to be reflected therefrom. A non-polarizing beam splitter 20 is disposed to receive the reflected beam and to amplitude split the incoming beam into two identical beams *a* and *b*, which are then introduced to respective analyzers 22, 24 which are complementary to the polarizing means 16 and may also be Nicol prisms or Polaroid sheets. The analyzers 22, 24 pass only that component of light which is polarized in a selected plane, which plane is herein determined by the polarizing means 16 and the state of magnetization of the storage medium 12. The beams passing through analyzers 22, 24 are introduced to respective photomultipliers 26 and 28 respectively. The outputs from the photomultipliers 26, 28 are fed to a differential amplifying means 30 which provides an output signal at terminal 32 representative of the information stored in the storage medium 12. The various components shown in FIGURE 1 are generally well known in the art and are accordingly not further described herein. As may be seen from FIGURE 1, the two beams are reflected from exactly the same incremental area of the storage medium 12 with the same direction of polarization and angle of incidence, and from the same light source 14, whereby accordingly all the fluctuations that arise from surface imperfections of the medium 12, change in reflectivity and in source 14 intensity will cancel out, and there will remain only the summed signal output appearing on output terminal 32. This summed output represents the information stored in the storage medium 12.

Figure 2:
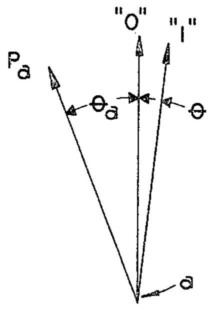
FIGURES 2 and 3 are schematic diagrams showing the relationship between the direction of polarization of the light beam reflected for two states of magnetization and the direction of the extinction axes of the analyzers.
Figure 3:
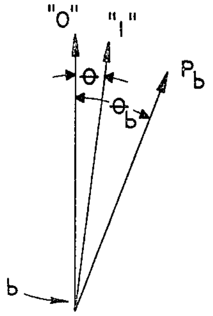

Referring to FIGURES 2 and 3, the manner of setting, or orienting, the analyzers 22, 24 is portrayed schematically by way of example only. The amplitude beam splitter 20 splits the light coming from the medium 12 into the two identical beams *a* and *b*. The respective beam analyzers 22, 24 are disposed to intercept the beams *a* and *b* as previously described, with their extinction axes $P_a$ and $P_b$ set substantially anti-symmetrically with respect to the "0" direction; that is $-\theta_a=\theta_b=\theta_o$ wherein $\theta_o$ is the absolute value of the angle between the analyzer's extinction axes and the direction of polarization of light. Although optimum noise cancellation is effected by making $-\theta_a=\theta_b$, the angles of analyzers 22, 24 need not be equal, but must be opposite, relative to the "0" direction for example. That is, the analyzer settings should be such that the information signal appearing in the channels A and B are out-of-phase. Under these conditions, the intensity of the light transmitted by the two analyzers 22, 24 is identical independently of noise. For a different state of magnetization, e.g., "1" the direction of polarization of the light will be "1" at an angle $\theta$ from the "0" state direction of polarization. Thus in the "1" state of magnetization, the extinction axis $P_a$ of the analyzer in the *a* beam will be at an agle $\theta_0+\theta$, and $P_b$ in the *b* beam will be at an agle $\theta_o-\theta$, with respect to the direction of polarization of the light. The difference in the light intensity transmitted by the two analyzers 22, 24 will depend only on $\theta$, the useful signal and not the noise.

Figure 4:
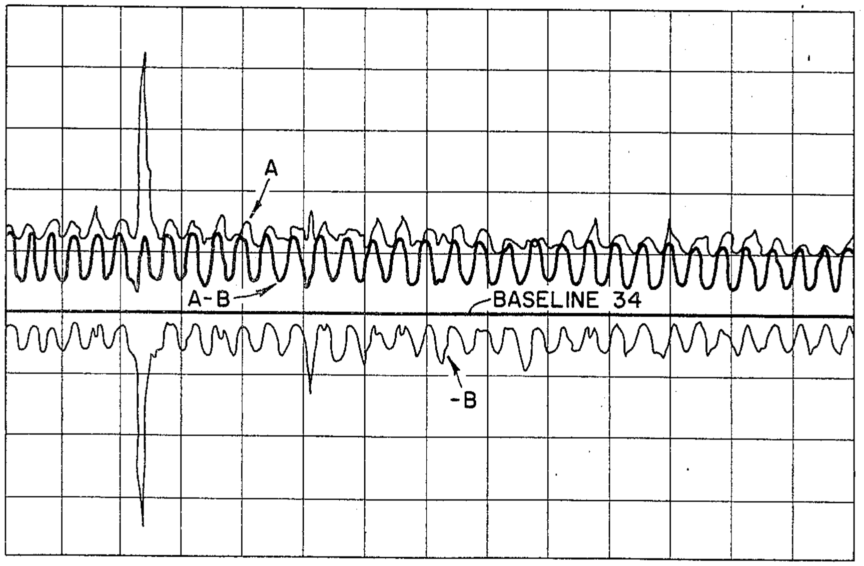
FIGURE 4 is a graph showing the scans obtained with the apparatus and method of the present invention, utilizing 25 micron bits with both analyzers oriented 4 minutes away from extinction.

FIGURE 4 is a graph of 25 micron bit scans obtained with the cancellation scheme of the invention showing, by way of example only, the effects of the greatly increased signal-to-noise ratio, wherein the analyzers 22, 24 were set 4 minutes from extinction; that is at an angle of 4 minutes from the angle which would prevent any light transmission by the analyzers 22, 24. Four traces are shown; a baseline 34 which is the zero light level, A and —B traces which are the output of the individual channels, and the *A—B* trace which is the difference of the A and B traces. The traces represent an alternating succession of "1" and "0" bits which are stored in the storage medium 12 and which are being read out by means of the magneto-optic system 10 of the invention. For example, the positive and negative excursions of the traces may be said to represent a "1" and a "0" digit respectively wherein the central trace excursions are relatively free of noise. The gain of the two channels is adjusted to minimize the surface noise in their difference signal. A remarkable reduction in surface noise is provided by the method and apparatus of the invention as shown for example, by comparing the central trace (A–B) wherein the noise has been cancelled, to the two outside traces (A and —B) which contain the surface noise as depicted by the "hashy" and poorly formed excursions of the traces.

By way of example only, the beam splitter 20 used in the apparatus of FIGURE 1, was a dielectric coat on a 6mm glass substrate. The splitter angle of incidence was 12.5 degrees. Quarter-wave plates (not shown) were introduced in both channels as a means for correcting for ellipticity caused by the beam splitter 20, and unsupported mica sheets were used in order to avoid interference effects.

Although the present invention has been described with relation to a single embodiment it is to be understood that various modifications and changes may be made within the spirit of the invention. For example, although the invention has been described utilizing the Kerr effect, it is equally adaptable for use with apparatus utilizing the Faraday magneto-optical effect, wherein the beam passes through the storage medium. Accordingly, it is not intended to limit the scope of the invention except as defined in the following claims:

What is claimed is:

1. A noise cancellation method for improving the signal-to-noise ratio of a magneto-optic readout system which utilizes a magnetic storage medium for storing information in the form of two different states of magnetization, the steps comprising, impinging the magnetic storage medium with a linearly polarized beam of light to provide a polarized beam of light from the medium, splitting the beam into two beams which are identical in every respect except in direction of propagation, modifying the split beams to cause noise signals to appear in phase and the information signals to appear in opposite polarity, sensing the degree of rotation of the plane of polarization of each of the split light beams to provide signals representative of the rotation and thus of the two states of magnetization, and combining the signals to add the information signals of opposite polarity while cancelling out the in phase noise signals thereof.

2. The noise cancellation method of claim 1 further comprising, orienting a beam analyzer in each split beam to make the noise signal appear in phase, and subtracting the sensed signals to provide a summed output representative of the information stored in the magnetic medium while cancelling the effect of the noise signals.

3. The noise cancellation method of claim 2 further comprising, orienting said analyzers with their extinction axes set anti-symmetrically with respect to the direction of a preselected state of magentization of the stored information, wherein the analyzers are set at selectable optimum angles to provide maximum signal-to-noise ratio.

4. The noise cancellation method of claim 3 further comprising, orienting one analyzer with its extinction axis set positively with respect to the direction of the preselected state of magnetization of said medium and orienting the other analyzer with its extinction axis set negatively with respect to the direction of said state of magnetization.

5. The noise cancellation method of claim 4 wherein the extinction axes are set at arbitrary fixed angles of the order of a degree.

6. The noise cancellation method of claim 5 further comprising inpinging the medium at a selected angle with the linearly polarized beam of light, splitting the beam of light from the medium into two equal beams to define two channels, and subtracting the signal from one channel from the signal in the other channel to thus add the out-of-phase information signals while cancelling the in-phase noise signals.

7. Apparatus for cancelling the noise signals due to surface imperfections and light fluctuations in a magneto-optic readout system utilizing a magnetic storage medium comprising:

means for introducing a linearly polarized light beam of high intensity against said magnetic storage medium;

beam splitter means disposed to receive the light from said storage medium and for splitting the beam into two beams identical in every respect except in direction of propagation;

means disposed to receive each split beam for sensing the degree of rotation of the plane of polarization of the split light beam;

differential amplifier means for subtracting the signals sensed by said sensing means to provide a summed output thereof which is representative of the information stored in said magnetic medium, while cancelling out the effects of the noise signals.

8. The apparatus of claim 7 wherein said means for sensing further comprises, a light beam analyzer disposed in each of the split light beams, said analyzers being oriented at a pre-selected arbitrary angle relative to the incoming beam, wherein such angles are anti-symmetrical with respect to the direction of a preselected state of magnetization of the storage medium and are optimized to provide the maximum signal-to-noise ratio.

References Cited

UNITED STATES PATENTS

| | | | |
|---|---|---|---|
| 3,155,944 | 11/1964 | Oberg et al. ------ | 340—174.1 |
| 3,268,879 | 8/1966 | Lins ------------ | 340—174.1 |

BERNARD KONICK, Primary Examiner

WILLIAM F. WHITE, Assistant Examiner

U.S. Cl. X.R.

340—174; 350—151